(12) United States Patent
Nakata

(10) Patent No.: US 11,347,227 B2
(45) Date of Patent: May 31, 2022

(54) AUTONOMOUS MOBILE APPARATUS

(71) Applicant: KABUSHIKI KAISHA TOYOTA JIDOSHOKKI, Kariya (JP)

(72) Inventor: Sho Nakata, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 287 days.

(21) Appl. No.: 16/561,726

(22) Filed: Sep. 5, 2019

(65) Prior Publication Data

US 2020/0081443 A1 Mar. 12, 2020

(30) Foreign Application Priority Data

Sep. 10, 2018 (JP) ................ JP2018-168485

(51) Int. Cl.
  *G05D 1/02* (2020.01)
  *G05D 1/00* (2006.01)

(52) U.S. Cl.
  CPC ......... *G05D 1/0214* (2013.01); *G05D 1/0088* (2013.01)

(58) Field of Classification Search
  CPC .................. G05D 1/0214; G05D 1/0088
  See application file for complete search history.

(56) References Cited

U.S. PATENT DOCUMENTS

| | | |
|---|---|---|
| 2006/0293856 A1 | 12/2006 | Foessel et al. |
| 2011/0166721 A1 | 7/2011 | Castaneda et al. |
| 2012/0053827 A1 | 3/2012 | Harada |

FOREIGN PATENT DOCUMENTS

| | | |
|---|---|---|
| EP | 2685337 A1 | 1/2014 |
| JP | 61-255414 A | 11/1986 |
| JP | 63-314621 A | 12/1988 |
| JP | 7-64633 A | 3/1995 |
| JP | 2010235073 A | 10/2010 |
| JP | 2012-48508 A | 3/2012 |
| JP | 2016-513981 A | 5/2016 |
| WO | 2014/113806 A1 | 7/2014 |

*Primary Examiner* — Michael D Lang
(74) *Attorney, Agent, or Firm* — Sughrue Mion, PLLC

(57) ABSTRACT

An autonomous mobile apparatus is provided that includes a traveling body, a sensor mounted to the traveling body, and circuitry. The circuitry is configured to: determine whether there is an obstacle in a search region, which extends in a direction of a route on which the traveling body travels, based on a detection result of the sensor; when the obstacle determination section determines that there is the obstacle in the search region, determine whether there is an obstacle avoiding region, in which the traveling body is able to avoid the obstacle, in horizontal directions that intersect a traveling direction; and when there is the obstacle in a traveling direction change region, which is located within the search region and smaller than the search region, change the traveling direction of the traveling body toward the obstacle avoiding region so that the traveling body performs an avoidance action.

6 Claims, 5 Drawing Sheets

AUTONOMOUS MOBILE APPARATUS

BACKGROUND

1. Field

The present disclosure relates to an autonomous mobile apparatus.

2. Description of Related Art

Japanese Laid-Open Patent Publication No. 7-64633 discloses an autonomous mobile apparatus. The autonomous mobile apparatus of this publication includes a controller and a sensor for detecting obstacles. When there is an obstacle on the travel route from the start point to the destination, the controller searches for an avoidance path. Upon finding an avoidance path, the controller navigates the autonomous mobile apparatus along the avoidance path.

When the autonomous mobile apparatus of the publication detects an obstacle, it searches for an avoidance path and travels along the avoidance path. As such, the autonomous mobile apparatus travels along the avoidance path regardless of whether the detected obstacle actually interferes with the traveling, in other words, regardless of whether the apparatus needs to avoid the obstacle. Depending on the travel route, the autonomous mobile apparatus may be able to proceed without avoiding the detected obstacle. Navigating the autonomous mobile apparatus to travel along an avoidance path in response to detection of an obstacle delays the arrival at the destination.

SUMMARY

It is an object of the present disclosure to provide an autonomous mobile apparatus that limits unnecessary avoidance actions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an autonomous mobile apparatus is provided that includes a traveling body, a sensor mounted to the traveling body, and circuitry. The circuitry is configured to: determine whether there is an obstacle in a search region, which extends in a direction of a route on which the traveling body travels, based on a detection result of the sensor; when the obstacle determination section determines that there is the obstacle in the search region, determine whether there is an obstacle avoiding region, in which the traveling body is able to avoid the obstacle, in horizontal directions that intersect a traveling direction; and when there is the obstacle avoiding region and there is the obstacle in a traveling direction change region, which is located within the search region and smaller than the search region, change the traveling direction of the traveling body toward the obstacle avoiding region so that the traveling body performs an avoidance action.

In another general aspect, a method for controlling an autonomous mobile apparatus is provided. The autonomous mobile apparatus includes a traveling body and a sensor mounted to the traveling body. The method includes: determining whether there is an obstacle in a search region, which extends in a direction of a route on which the traveling body travels, based on a detection result of the sensor; when the obstacle is determined to be present in the search region, determining whether there is an obstacle avoiding region, in which the traveling body is able to avoid the obstacle, in horizontal directions that intersect a traveling direction; and when there is the obstacle avoiding region and there is the obstacle in a traveling direction change region, which is located within the search region and smaller than the search region, changing the traveling direction of the traveling body toward the obstacle avoiding region so that the traveling body performs an avoidance action.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An autonomous mobile apparatus 10 according an embodiment will now be described.

Figure 1:
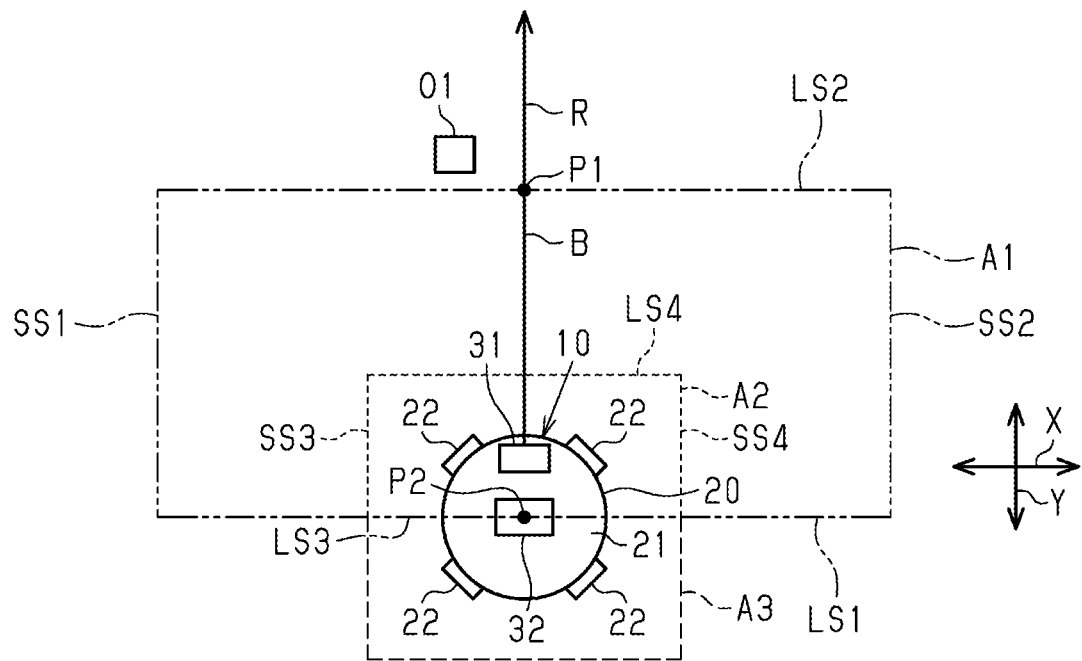
FIG. 1 is a plan view of an autonomous mobile apparatus.

As shown in FIG. 1, the autonomous mobile apparatus 10 includes a vehicle 20, which is a traveling body, a sensor 31 mounted to the vehicle 20, and a controller 32 mounted to the vehicle 20. The vehicle 20 includes a vehicle body 21 and wheels 22. The autonomous mobile apparatus 10 is a transporter for transporting cargo.

The wheels 22 of the present embodiment are omnidirectional wheels. An omnidirectional wheel is a wheel that, in addition to rotating together with the axle shaft, permits movements in the axial direction of the axle shaft. The vehicle 20 has four wheels 22. Controlling the rotation speed and the rotation direction of the wheels 22 allows the vehicle 20 to move in any direction while maintaining the orientation of the vehicle body 21, to move while changing the orientation of the vehicle body 21, and to change the orientation of the vehicle body 21 while in stationary condition. The term "any direction" refers to the directions in which the vehicle 20 is movable on road or floor surfaces.

Figure 2:
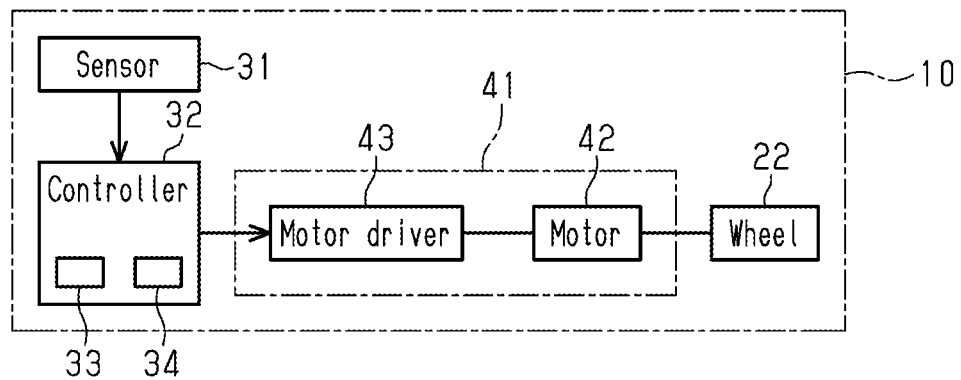
FIG. 2 is a block diagram of the autonomous mobile apparatus of FIG. 1.

As shown in FIG. 2, the autonomous mobile apparatus 10 includes a drive mechanism 41 for driving the wheels 22. The drive mechanism 41 includes motors 42 for rotating the wheels 22 and motor drivers 43 for driving the motors 42. Although not shown, the motors 42 and the motor drivers 43 are equal in number to the wheels 22. The motor drivers 43 control the rotation speed of the motors 42 in accordance with commands from the controller 32. The controller 32 controls the traveling direction of the vehicle 20 by controlling the rotation speed of the motors 42 through the motor drivers 43.

The sensor 31 and the controller 32 are now described in detail.

The sensor 31 allows the controller 32 to detect obstacles. The sensor 31 of this embodiment is a laser rangefinder. The laser rangefinder is a distance meter that measures the distance by emitting laser beams to the surroundings and receiving the reflection light reflected from a part hit by the laser beam. The present embodiment uses a two-dimensional laser rangefinder, which emits laser beams while changing the beam angles in horizontal directions.

When the part hit by the laser beam is referred to as a reflection point, the sensor 31 measures the distance to the reflection point in association with the emission angle. That is, the sensor 31 obtains relative coordinates that indicate the distance between the vehicle 20 and the reflection point. In the present embodiment, the sensor 31 emits laser beams in an angle range of 270° in horizontal directions.

As shown in FIG. 1, when the median of the emission angles is referred to as a reference axis B, the possible angles are in the range of ±135 degrees to the reference axis B. The relative coordinates obtained by the sensor 31 are in an orthogonal coordinate system in which the Y axis extends in the direction of the reference axis B and the X axis is perpendicular to the Y axis.

As shown in FIG. 2, the controller 32 includes a CPU 33 and a storage section 34 including RAM and ROM, for example. The storage section 34 stores various programs for controlling the vehicle 20. The controller 32 may include a dedicated hardware that performs at least part of various processes, such as an application-specific integrated circuit (ASIC). The controller 32 may be configured as circuitry that includes at least one processor that operates according to a computer program, at least one dedicated circuit such as an ASIC, or a combination of these. The processor includes a CPU and memory, such as RAM and ROM. The memory stores program codes or instructions that enable the CPU to perform processes. The memory, or the computer-readable medium, may be any medium that can be accessed by a general-purpose or dedicated computer.

As shown in FIG. 1, the controller 32 generates a travel route R to allow the vehicle 20 to travel. The travel route R is a route from the current position, which is the start point of the vehicle 20, to the destination. When the vehicle 20 travels in a straight line, the travel route R and the reference axis B are in the same direction. In FIG. 1, the travel route R coincides with the reference axis B. Examples of a method for generating the travel route R include a method that generates a route by making a grid map of possible travel paths, and a method using a potential field. The controller 32 functions as a route generating section.

The controller 32 sets a target point P1, which is a point on the travel route R that is spaced apart from the vehicle 20 by a predetermined distance, and controls the drive mechanism 41 to travel toward the target point P1. The controller 32 navigates the vehicle 20 such that the reference axis B of the sensor 31 is aligned with the traveling direction of the vehicle 20. Further, the controller 32 performs an obstacle avoidance process, which maintains the distance between the vehicle 20 and an obstacle at a predetermined value or more so as not to bring the vehicle 20 into contact with the obstacle.

The obstacle avoidance process performed by the controller 32 and its operations are now described. The obstacle avoidance process is repeated while the vehicle 20 is traveling.

Figure 3:
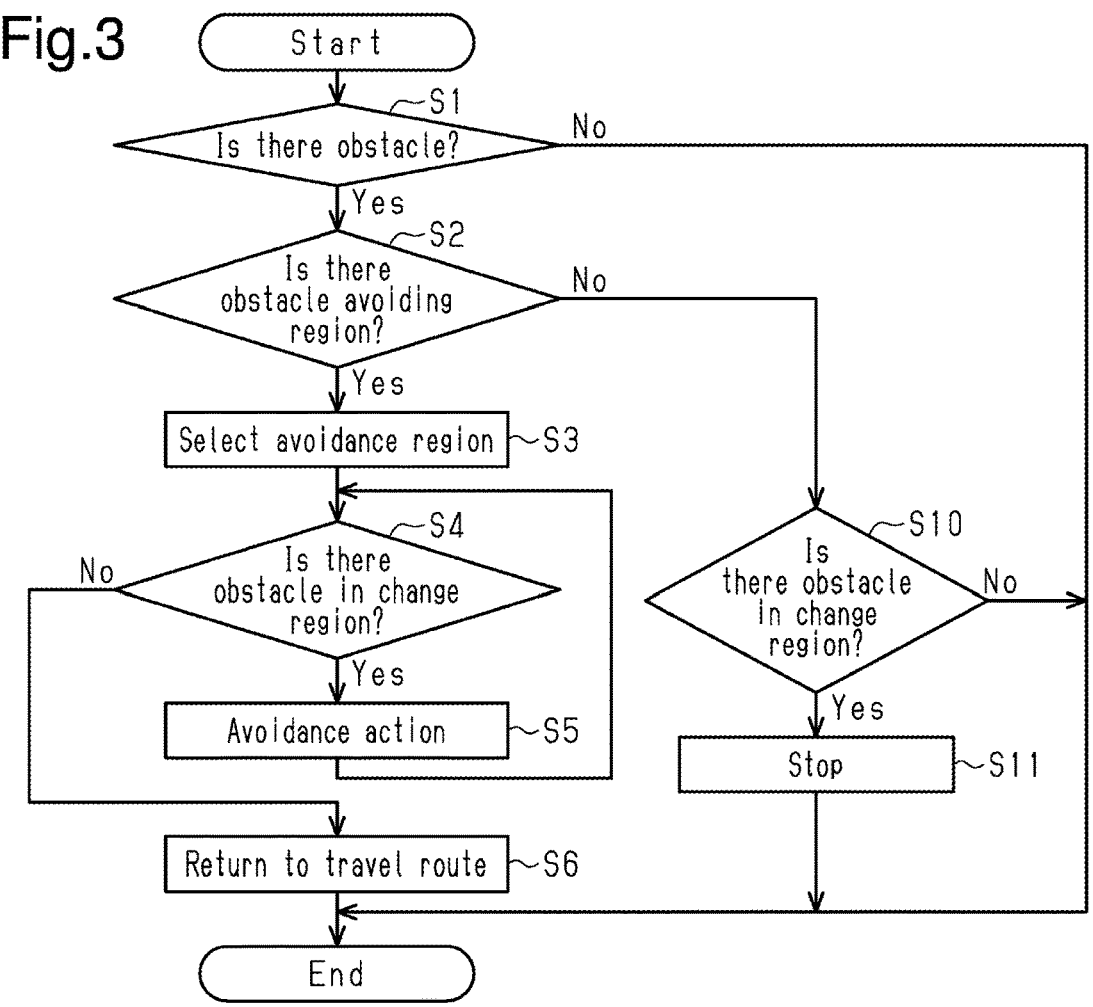
FIG. 3 is a flowchart showing an obstacle avoidance process.
Figure 4:
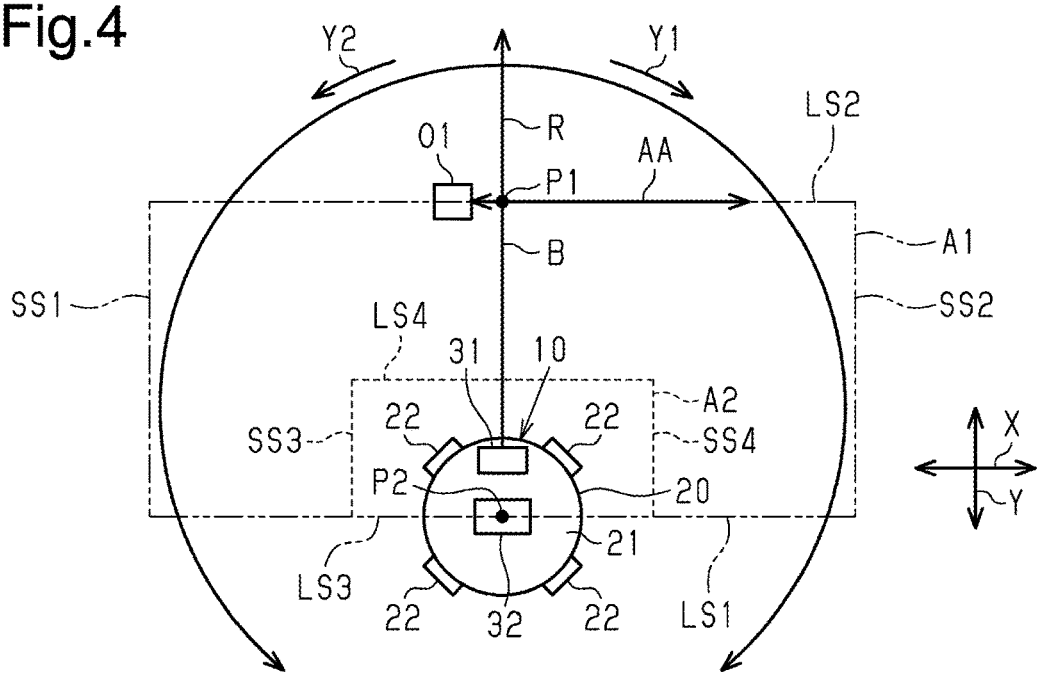
FIG. 4 is a schematic view showing a process of searching for an obstacle avoiding region.

As shown in FIGS. 3 and 4, at step S1, the controller 32 determines whether there is an obstacle in a search region A1. First, the controller 32 detects any obstacle located in the traveling direction of the vehicle 20 based on the detection result of the sensor 31. When a reflection point detected by the sensor 31 has its X and Y coordinates within the search region A1, the controller 32 identifies this reflection point as an obstacle and determines that there is an obstacle.

The search region A1 is rectangular and has two long sides LS1 and LS2 extending in the X-axis direction. One of the two long sides LS1 and LS2 passes through a prescribed position P2 in the vehicle 20, and the other is located ahead of the vehicle 20 in the traveling direction. The search region A1 extends from the vehicle 20 in the direction of the route on which the vehicle 20 travels. The direction of the route on which the vehicle 20 travels refers to the direction in which the vehicle 20 travels on the set travel route R. The prescribed position P2 may be any fixed position in the vehicle 20 that is prescribed. In the present embodiment, the prescribed position P2 is at the center of the vehicle body 21 in the Y-axis direction and in the X-axis direction. The search region A1 is symmetrical with respect to the reference axis B.

The dimension of the search region A1 in the Y-axis direction is determined depending on how far the obstacle search is performed in the direction of the route on which the vehicle 20 travels. In this embodiment, the distance in the Y-axis direction from the prescribed position P2 to the target point P1 is the dimension of the search region A1 in the Y-axis direction, that is, the dimension of the short sides SS1 and SS2 of the search region A1. The dimension of the search region A1 in the Y-axis direction is set, for example, according to the time required to move the vehicle 20 to a position where the vehicle 20 can avoid an obstacle after detecting the obstacle. To avoid obstacles, the target point P1 does not necessarily have to be on the long side LS2 and may be shifted as appropriate with consideration given to the agility and the target trackability of the vehicle 20 in avoidance.

The dimension of the search region A1 in the X-axis direction is determined by how far the obstacle search is performed in directions intersecting the direction of the route on which the vehicle 20 travels. The dimension of the search region A1 in the X-axis direction may vary depending on the place where the vehicle 20 is intended to travel and also depending on factors such as the layout of the room and the width of the road. When the place where the autonomous mobile apparatus 10 travels is fixed in advance, the dimension of the search region A1 in the X-axis direction may be a fixed value set in advance according to the place. When the place where the autonomous mobile apparatus 10 travels is not fixed, the controller 32 may change the dimension of the search region A1 in the X-axis direction according to the place where the autonomous mobile apparatus 10 travels.

At step S1, when there is no obstacle in the search region A1, the controller 32 ends the process. When there is an obstacle in the search region A1, the controller 32 performs the process of step S2. The controller 32 functions as an obstacle determination section.

At step S2, the controller 32 determines whether there is an obstacle avoiding region AA in the search region A1. First, the controller 32 searches for an obstacle avoiding region AA in the search region A1. To search for an obstacle avoiding region AA, the controller 32 may search the search region A1 clockwise from the reference axis B as indicated by arrow Y1 in FIG. 4. Then, the controller 32 searches the search region A1 counterclockwise as shown by arrow Y2. An obstacle avoiding region AA is a space in which the vehicle 20 can travel in the Y-axis direction with the distance to the obstacle maintained at the predetermined value or more when the vehicle 20 is aligned with the obstacle in the X-axis direction. That is, an obstacle avoiding region AA is a space in which the vehicle 20 can pass the obstacle while maintaining the distance to the obstacle at the predetermined value or more. The predetermined value is set to limit contact between an obstacle and the vehicle 20, taking account of the detection accuracy of the sensor 31 and the possibility that the obstacle is a moving object.

When there is a space having a dimension from the obstacle in the X-axis direction that is greater than or equal to a threshold in the search region A1, the controller 32 identifies this space as an obstacle avoiding region AA. The threshold is set based on a dimension that allows the vehicle 20 to travel with the distance between the vehicle 20 and an obstacle maintained at the predetermined value or more. In the example shown in FIG. 5, there is one obstacle O1 in the search region A1. The space between the obstacle O1 and the short side SS1 of the search region A1 and the space between the obstacle O1 and the short side SS2 of the search region A1 each have a dimension in the X-axis direction that is greater than or equal to the threshold. Thus, these spaces are both obstacle avoiding regions AA.

Figure 6:
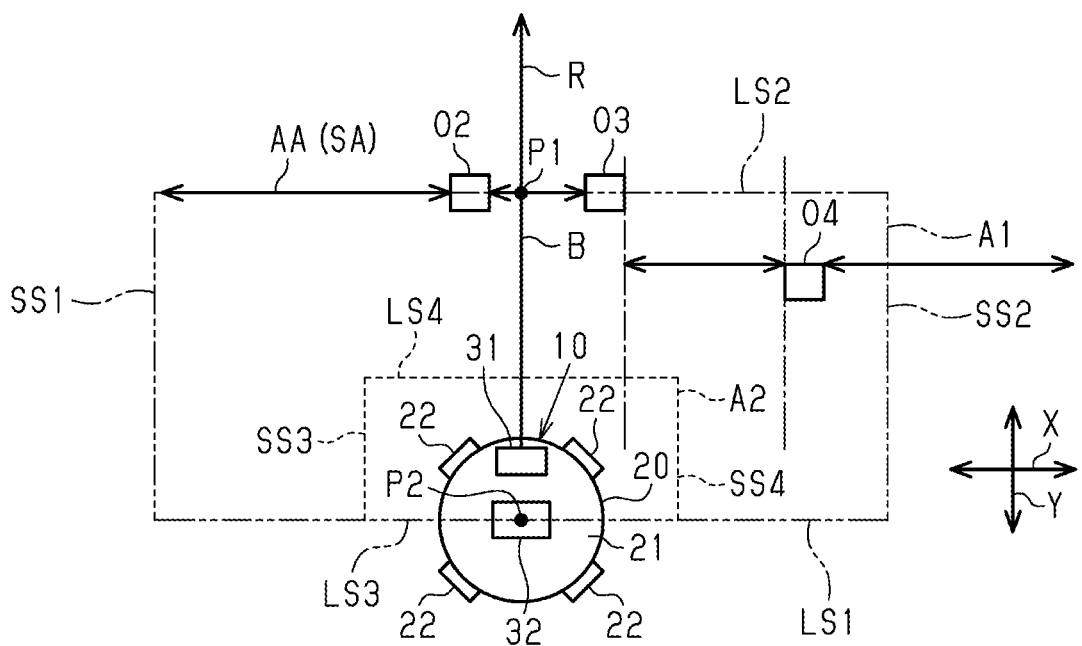
FIG. 6 is a schematic view showing an obstacle avoiding region in a situation in which there are multiple obstacles.

In contrast, the example shown in FIG. 6 has three obstacles O2, O3 and O4 arranged in the X-axis direction. The obstacles O2, O3 and O4 arranged in the X-axis direction are referred to as a first obstacle O2, a second obstacle O3, and a third obstacle O4. The dimension in the X-axis direction between the first obstacle O2 and the second obstacle O3 is less than the threshold. The dimension between the second obstacle O3 and the third obstacle O4 is less than the threshold. Although the second obstacle O3 and the third obstacle O4 have different Y coordinates, identification of an obstacle avoiding region AA only uses the dimensions in the X-axis direction.

The space between the first obstacle O2 and the short side SS1 has a dimension in the X-axis direction that is greater than or equal to the threshold and is thus an obstacle avoiding region AA. Although there is a space greater than or equal to the threshold extending in the direction toward the short side SS2 from the third obstacle O4, the dimension in the X-axis direction of the space between the third obstacle O4 and the short side SS2 is less than the threshold. Since an obstacle avoiding region AA is a space within the search region A1, the space between the third obstacle O4 and the short side SS2 is not an obstacle avoiding region AA. As such, the example shown in FIG. 6 has only one obstacle avoiding region AA.

Referring again to a circumstance with one obstacle, as shown in FIG. 3, the controller 32 performs the process of step S10 when there is no obstacle avoiding region AA in the search region A1. When there is an obstacle avoiding region AA in the search region A1, the controller 32 performs the process of step S3. The controller 32 functions as a searching section.

Figure 5:
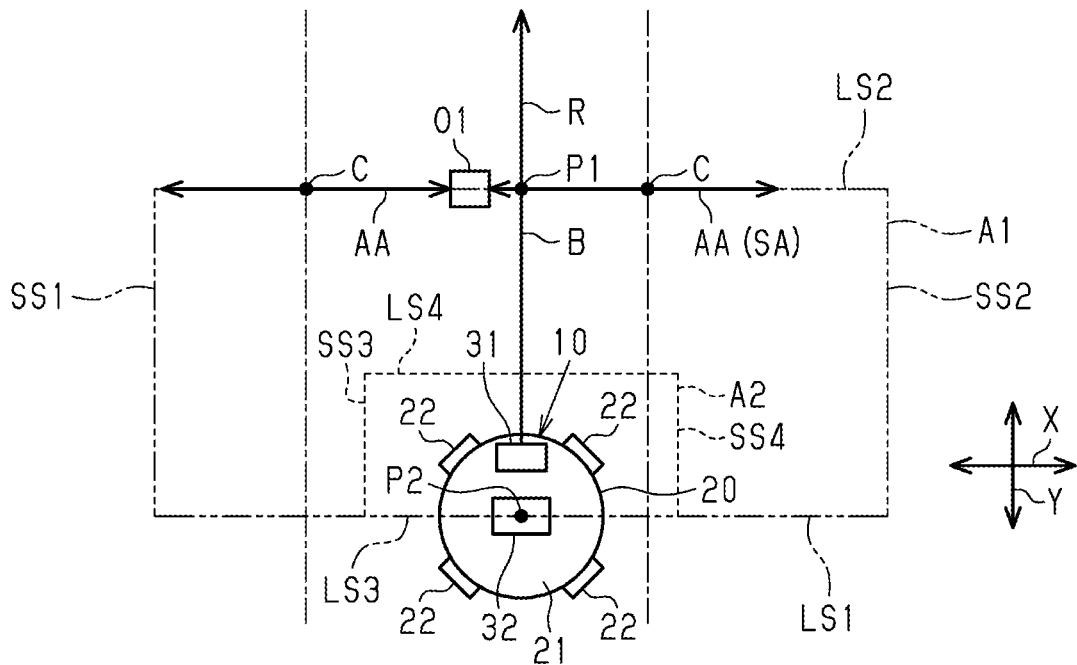
FIG. 5 is a schematic view showing obstacle avoiding regions in a situation in which there is one obstacle.

As shown in FIGS. 3 and 5, at step S3, the controller 32 selects one obstacle avoiding region AA to be used when an avoidance action is performed. Hereinafter, the obstacle avoiding region AA to be used when an avoidance action is performed is referred to as an avoidance region SA. When the search region A1 has multiple obstacle avoiding regions AA, the controller 32 calculates the distance from the sensor 31 to the center C in the X-axis direction of each of the obstacle avoiding regions AA. The controller 32 selects, as the avoidance region SA, the obstacle avoiding region AA having the shortest distance from the sensor 31 to the center C, that is, the obstacle avoiding region AA closest to the vehicle 20.

As in the example shown in FIG. 6, when there is only one obstacle avoiding region AA, the controller 32 selects this obstacle avoiding region AA as the avoidance region SA.

The controller 32 then performs the process of step S4. The controller 32 functions as a calculation section.

At step S4, the controller 32 determines whether there is an obstacle in a traveling direction change region A2. In the following description, the traveling direction change region A2 is referred to as a change region A2. When there is an obstacle in the change region A2, the controller 32 performs the process of Step S5.

Figure 7:
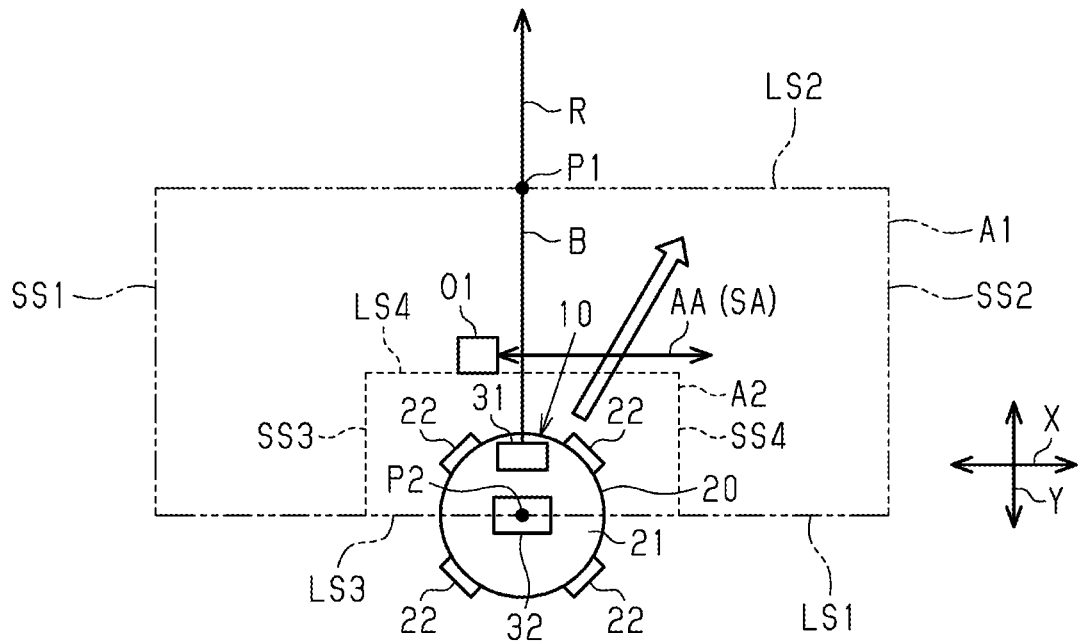
FIG. 7 is a diagram showing the movement of a vehicle for an avoidance action.

As shown in FIGS. 3 and 7, at step S5, the controller 32 controls the vehicle 20 to move toward the avoidance region SA. When there is an obstacle in the change region A2, the vehicle 20 travels so as to avoid the obstacle. The change region A2 can be considered as a region for determining whether to actually perform an avoidance action for the detected obstacle. Even when there are obstacles in the search region A1, an avoidance action is not performed when the change region A2 is free of an obstacle. An avoidance action is performed only when there is an obstacle in the change region A2. As in the example of FIG. 6, when the controller 32 detects multiple obstacles O2 to O4, an avoidance action is performed when at least one of the obstacles O2 to O4 is in the change region A2. The controller 32 functions as a traveling direction changing section.

The change region A2 is an area within the search region A1. The change region A2 is rectangular and has two long sides LS3 and LS4 extending in the X-axis direction. One of the two long sides LS3 and LS4 passes through the prescribed position P2, and the other is located ahead of the vehicle 20 in the traveling direction. The change region A2 extends from the vehicle 20 in the direction of the travel route R, on which the vehicle 20 travels. The change region A2 is symmetrical with respect to the reference axis B.

The change region A2 is smaller than the search region A1. The term "smaller" indicates that the change region A2 has a smaller area in the XY plane than the search region A1. The dimension of the change region A2 in the Y-axis direction is shorter than the dimension of the search region A1 in the Y-axis direction. The dimension of the change region A2 in the X-axis direction is shorter than the dimension of the search region A1 in the X-axis direction.

The dimension of the change region A2 in the Y-axis direction, that is, the dimension of the short sides SS3 and SS4 of the change region A2 determines the avoidance start distance at which the vehicle 20 starts an avoidance action.

The controller 32 starts an avoidance action when the distance between the vehicle 20 and an obstacle in the Y-axis direction becomes less than the dimension of the change region A2 in the Y-axis direction.

The dimension of the change region A2 in the X-axis direction determines the avoidance distance for avoidance actions. The avoidance distance is the distance between the vehicle 20 and an obstacle in the X-axis direction. The dimension of the change region A2 in the X-axis direction is longer than the longest dimension of the vehicle 20 in the X-axis direction. The difference between the dimension of the vehicle 20 in the X-axis direction and the dimension of the change region A2 in the X-axis direction determines the avoidance distance.

Figure 8:
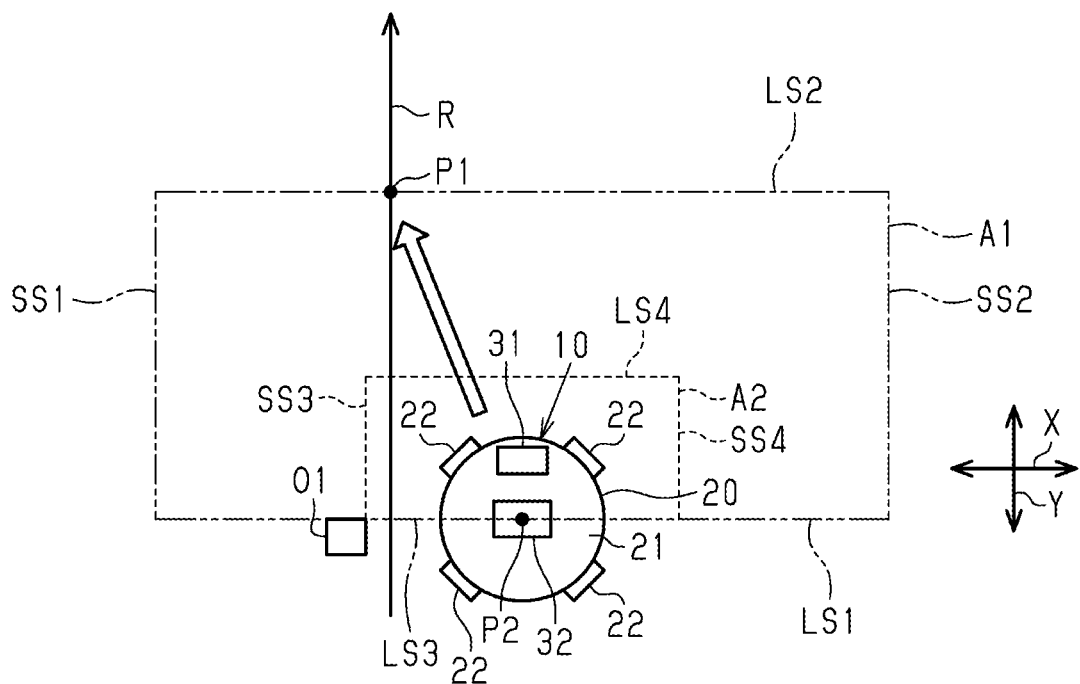
FIG. 8 is a diagram showing the movement of the vehicle after completion of the avoidance action.

As shown in FIGS. 7 and 8, the avoidance action navigates the vehicle 20 from the travel route R toward the avoidance region SA, so that the vehicle 20 travels diagonally with respect to the travel route R. During the avoidance action, the X coordinate of the vehicle 20 departs from the X coordinate of the travel route R, and the vehicle 20 deviates from the travel route R. The travel route R can be considered as a route on which the vehicle 20 travels when no avoidance action is performed.

When an avoidance action is performed, the traveling direction of the vehicle 20 becomes different from the direction in which the travel route R extends, and the traveling direction of the vehicle 20 becomes diagonal to the direction of the travel route R. The controller 32 changes the orientation of the search region A1 according to the direction of the travel route R. That is, even when the traveling direction of the vehicle 20 becomes different from the direction of the travel route R due to an avoidance action, the orientation of the search region A1 remains unchanged unless the direction of the travel route R is changed. The controller 32 controls the orientation of the search region A1 such that the long side LS1 is perpendicular to the travel route R regardless of the traveling direction of the vehicle 20. Specifically, when the vehicle 20 deviates from the travel route R, the controller 32 draws a perpendicular from the prescribed position P2 of the vehicle 20 to the travel route R, and a point where the perpendicular intersects the travel route R is considered as the position of the vehicle 20 on the travel route R. The controller 32 sets the search region A1 as if the vehicle 20 is located at the position of the vehicle 20 on the travel route R, so that the orientation of the search region A1 is changed according to the direction of the travel route R.

Figure 9:
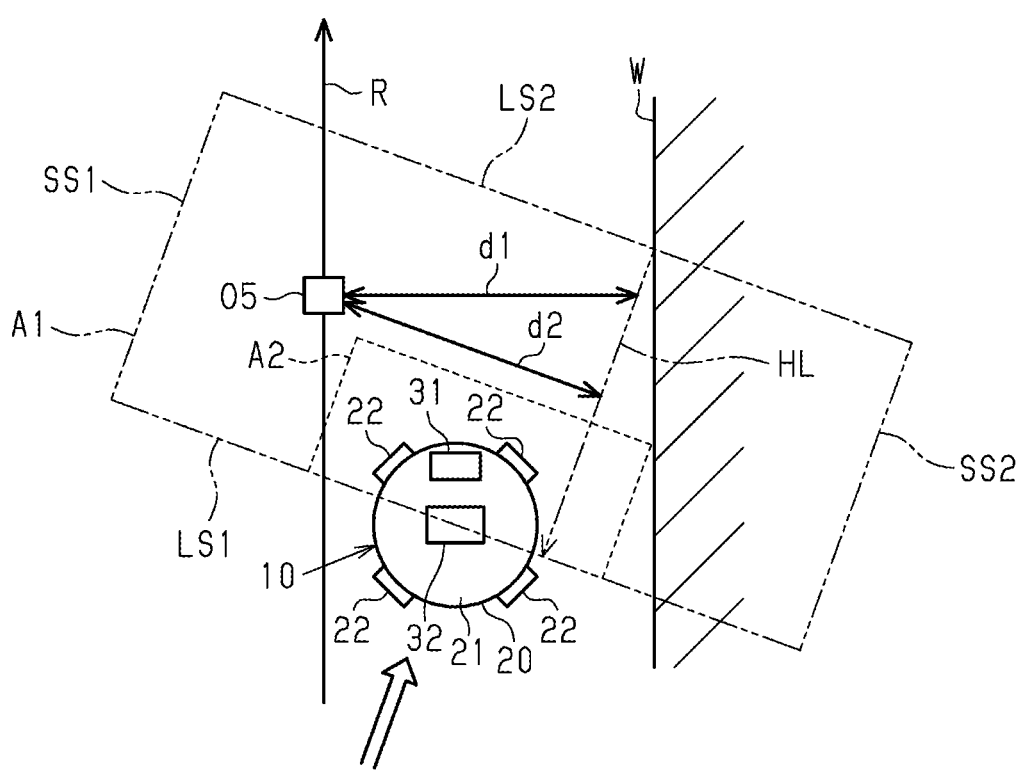
FIG. 9 is a diagram showing the autonomous mobile apparatus in a situation in which the traveling direction of the vehicle coincides with the orientation of the search region.

As shown in FIG. 9, if the orientation of the search region A1 is changed according to the traveling direction of the vehicle 20, this would lower the detection accuracy of obstacle avoiding regions AA. In the example shown in FIG. 9, there is a space between an obstacle O5 and a wall W, and the dimension d1 in the X-axis direction of this space is greater than or equal to the threshold. In order to keep the search region A1 rectangular, when the laser beam reflects off the wall W, the controller 32 draws a perpendicular HL from the reflection point on the wall W and sets the region between the perpendicular HL and the short side SS1 as the search region A1. Although the dimension d1 of the space between the obstacle O5 and the wall W is greater than or equal to the threshold, the dimension d2 detected by the controller 32 is less than the threshold. In contrast, the present embodiment changes the orientation of the search region A1 according to the direction of the travel route R, thereby reducing a difference between the dimension of the space detected by the controller 32 and the dimension of the actual space.

As shown in FIG. 3, after completing the process of step S5, the controller 32 performs the process of step S4. That is, while it is determined at step S4 that the obstacle is present, the avoidance action is performed at step S5.

As shown in FIGS. 3 and 8, when it is determined at step S4 that there is no obstacle in the change region A2, the controller 32 performs the process of step S6. Specifically, when the obstacle is still in the change region A2, it is continuously determined at step S4 that the obstacle is present, and the avoidance action at step S5 continues. When the avoidance action is completed, there is no obstacle in the change region A2, and the process of step S6 is performed.

At step S6, the controller 32 returns the vehicle 20 to the travel route R and ends the process. Specifically, after the avoidance action is performed at step S5, the controller 32 controls the drive mechanism 41 to return the vehicle 20 to the travel route R. This brings the X coordinate of the vehicle 20 closer to the X coordinate of the travel route R and returns the vehicle 20 to the travel route R. When an avoidance action is not performed, a state in which the vehicle 20 travels on the travel route R is maintained.

At step S10, the controller 32 determines whether there is an obstacle in the change region A2. When there is an obstacle in the change region A2, the controller 32 performs the process of step S11. When there is no obstacle in the change region A2, the controller 32 ends the process. At step S11, the controller 32 stops the vehicle 20. That is, the controller 32 stops the vehicle 20 when there is an obstacle in change region A2 and the search region A1 does not include an obstacle avoiding region AA.

Advantages of the embodiment will now be described.

(1) The autonomous mobile apparatus 10 does not perform an avoidance action when there is no obstacle in the change region A2 even if there is an obstacle in the search region A1. When there is an obstacle in the change region A2, the autonomous mobile apparatus 10 performs an avoidance action and moves toward an obstacle avoiding region AA. Even when an obstacle is detected, an avoidance action is not performed unless the obstacle is within the change region A2, which is smaller than the search region A1, thereby reducing unnecessary avoidance actions.

(2) The dimension of the change region A2 in the X-axis direction determines the avoidance distance, and the dimension of the change region A2 in the Y-axis direction determines the avoidance start distance. The dimension of the change region A2 in the X-axis direction is set separately from the dimension of the change region A2 in the Y-axis direction, allowing the avoidance distance and the avoidance start distance to be independently controlled.

(3) The controller 32 changes the orientation of the search region A1 in accordance with the direction of the travel route R. The travel route R determines the orientation of the search region A1 even when an avoidance action changes the traveling direction, improving the detection accuracy of obstacle avoiding regions AA. This enables an appropriate avoidance action.

(4) The controller 32 returns to the travel route R after completing an avoidance action. This allows the vehicle 20 to travel on the generated travel route R. The vehicle 20 travels on the travel route R that is already generated, reducing the load on the controller 32 as compared with a configuration that generates a new travel route to avoid an obstacle.

(5) The controller 32 navigates the vehicle 20 through the closest obstacle avoiding region AA in an avoidance action. This minimizes the traveling distance and increases the efficiency of traveling.

The present embodiment may be modified as follows. The present embodiment and the following modifications can be combined as long as the combined modifications remain technically consistent with each other.

When the search region A1 includes multiple obstacle avoiding regions AA, the controller 32 may use any of the obstacle avoiding regions AA as the avoidance region SA. For example, the controller 32 may select as the avoidance region SA one of the obstacle avoiding regions AA that is farthest from the vehicle 20.

When the search region A1 includes multiple obstacle avoiding regions AA, the controller 32 may identify the closest obstacle avoiding region AA based on the distance to the edge in the X-axis direction of each obstacle avoiding region AA. That is, the closest obstacle avoiding region AA may be identified based on the distance to a position other than the center C as long as the same reference position is used for the different obstacle avoiding regions AA to calculate the distances to the sensor 31.

The controller 32 may change the travel route R when performing an avoidance action. That is, the controller 32 may generate a travel route R in accordance with the path used in the avoidance action.

Although the travel route R extends from the current position, which is the start point of the vehicle 20, to the destination, the present invention may be used for a part of the travel route R.

The controller 32 does not have to generate a travel route. In this case, the controller 32 navigates the vehicle 20 on a predetermined travel route.

Referring to FIG. 1, the controller 32 may determine that the vehicle 20 has passed through the avoidance region SA when there is no obstacle between the travel route R and a determination region A3, which extends in the direction opposite to the traveling direction of the vehicle 20. This allows for determination whether the vehicle 20 has passed through the avoidance region SA. Returning the vehicle 20 to the travel route R after it is determined that the vehicle 20 has passed through the avoidance region SA limits contact between the vehicle 20 and the obstacle. That is, the determination region A3 provides a safety margin when the vehicle 20 returns to the travel route R after an avoidance action.

The sensor 31 may be a laser rangefinder that can alter the emission angle of laser beam toward a vertical direction from horizontal directions. In this case, as the coordinates of a reflection point, three-dimensional coordinates are obtained that include a Z coordinate, which is a coordinate in the vertical direction, in addition to X and Y coordinates. The controller 32 identifies reflection points having Z coordinates of less than or equal to a predetermined coordinate as relevant reflection points and performs clustering of these reflection points based on their X and Y coordinates. The predetermined coordinate is set so as to detect an obstacle located at a height that causes the moving vehicle 20 or the cargo on the vehicle 20 to collide with the obstacle.

The sensor 31 may be a stereo camera. The stereo camera allows the controller 32 to recognize the surrounding environment from disparity images obtained by photographing the surrounding environment with multiple cameras. When a certain characteristic point is photographed with the different cameras, a disparity image shows the differences between the pixels in images taken with these cameras. The characteristic point may be a part that shows a parallax, such as an edge of an object. The controller 32 obtains the distance to the characteristic point from the disparity image. The controller 32 detects an obstacle from a group of characteristic points.

The sensor 31 may be an ultrasonic sensor that measures a distance by emitting ultrasonic waves.

The dimension of the search region A1 in the Y-axis direction may increase as the velocity of the vehicle 20 increases. In this case, a higher velocity of the vehicle 20 results in searching for an obstacle avoiding region AA farther ahead of the vehicle 20. A higher velocity brings the vehicle 20 to an obstacle in a shorter time after the detection of the obstacle. Earlier detection of an obstacle and an obstacle avoiding region AA enables an appropriate avoidance action. In addition, the dimension of the change region A2 in the Y-axis direction may increase with the velocity of the vehicle 20.

The dimension in the Y-axis direction and the dimension in the X-axis direction of the search region A1 may be variable according to the map information. The map information may be stored in advance in the storage section 34 or may be acquired using the mapping function of the controller 32.

The threshold for identifying an obstacle avoiding region AA may increase as the velocity of the vehicle 20 increases.

The shape of the search region A1 may be modified. For example, the search region A1 may extend in the traveling direction of the vehicle 20 from the long side LS1 in a circular shape. Likewise, the shape of the change region A2 may be modified.

The process of step S11 may be modified. That is, the process performed by the controller 32 when there is an obstacle in the change region A2 and the search region A1 does not have an obstacle avoiding region AA may be modified as appropriate. For example, a travel route different from the travel route R may be generated, and the vehicle 20 may travel on this travel route.

The wheels 22 may be wheels other than omnidirectional wheels, that is, wheels that do not permit movements of the wheels 22 in the direction along the rotation axis. In this case, two wheels may be used, and the traveling direction of the vehicle 20 may be changed by the differential drive, which steers the vehicle 20 by rotating the two wheels at different speeds. Alternatively, each wheel may have an individual steering mechanism and be steered individually to change the traveling direction.

The autonomous mobile apparatus 10 is not limited to a transporter for transporting cargo and may be an autonomous vacuum cleaner, for example.

The traveling body is not limited to a vehicle with wheels, and may be a multi-legged traveling body, for example.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An autonomous mobile apparatus comprising:
a traveling body;
a sensor mounted to the traveling body; and
circuitry that is configured to
   determine whether there is an obstacle in a search region, which extends in a direction of a travel route on which the traveling body travels, based on a detection result of the sensor,
   when the obstacle determination section determines that there is the obstacle in the search region, determine whether there is an obstacle avoiding region, in which the traveling body is able to avoid the obstacle, in horizontal directions that intersect a traveling direction, and
   when there is the obstacle avoiding region and there is the obstacle in a traveling direction change region, which is located within the search region and smaller than the search region, change the traveling direction of the traveling body toward the obstacle avoiding region so that the traveling body performs an avoidance action,
wherein the traveling direction change region extends from the traveling body in a direction of the travel route,
wherein a dimension of the traveling direction change region in the direction of the travel route is shorter than a dimension of the search region in the direction of the travel route,
wherein a dimension of the traveling direction change region in a right direction along a vehicle width direction is shorter than a dimension of the search region in the right direction along the vehicle width direction, and
wherein a dimension of the traveling direction change region in a left direction along the vehicle width direction is shorter than a dimension of the search region in the left direction along the vehicle width direction.

2. The autonomous mobile apparatus according to claim 1, wherein the circuitry is configured to
generate a travel route on which the traveling body travels when the traveling body does not perform the avoidance action, and
change an orientation of the search region in accordance with a direction of the travel route.

3. The autonomous mobile apparatus according to claim 2, wherein the circuitry is configured to
control the traveling body so that the traveling body deviates from the travel route to change the traveling direction of the traveling body toward the obstacle avoiding region, and
control the traveling body so that the traveling body returns to the travel route after passing through the obstacle avoiding region.

4. The autonomous mobile apparatus according to claim 3, wherein the circuitry is configured to determine that the traveling body has passed through the obstacle avoiding region when the obstacle is no longer present between the travel route and a determination region, which extends in a direction opposite to the traveling direction of the traveling body.

5. The autonomous mobile apparatus according to claim 1, wherein the circuitry is configured to
calculate a distance to the obstacle avoiding region, and
when the obstacle avoiding region is one of a plurality of obstacle avoiding regions that are found, control the traveling body to move toward one of the obstacle avoiding regions that is closest to the traveling body.

6. A method for controlling an autonomous mobile apparatus including a traveling body and a sensor mounted to the traveling body, the method comprising:
determining whether there is an obstacle in a search region, which extends in a direction of a travel route on which the traveling body travels, based on a detection result of the sensor; when the obstacle is determined to be present in the search region, determining whether there is an obstacle avoiding region, in which the traveling body is able to avoid the obstacle, in horizontal directions that intersect a traveling direction; and when there is the obstacle avoiding region and there is the obstacle in a traveling direction change region, which is located within the search region and smaller than the search region, changing the traveling direction of the traveling body toward the obstacle avoiding region so that the traveling body performs an avoidance action, wherein the traveling direction change region extends from the traveling body in a direction of the travel route, wherein a dimension of the traveling direction change region in the direction of the travel route is shorter than a dimension of the search region in the direction of the travel route, wherein a dimension of the traveling direction change region in a right direction along a vehicle width direction is shorter than a dimension of the search region in the right direction along the vehicle width direction, and wherein a dimension of the traveling direction change region in a left direction along the vehicle width direction is shorter than a dimension of the search region in the left direction along the vehicle width direction.

* * * * *